(12) United States Patent
Mani et al.

(10) Patent No.: US 11,768,560 B2
(45) Date of Patent: Sep. 26, 2023

(54) SYSTEM AND METHOD FOR REDUCING DISPLAY INTERFERENCE

(71) Applicant: SYNAPTICS INCORPORATED, San Jose, CA (US)

(72) Inventors: Sanjay Mani, Los Altos Hills, CA (US); Joseph Kurth Reynolds, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 256 days.

(21) Appl. No.: 16/453,694

(22) Filed: Jun. 26, 2019

(65) Prior Publication Data

US 2020/0201475 A1 Jun. 25, 2020

Related U.S. Application Data

(60) Provisional application No. 62/784,016, filed on Dec. 21, 2018.

(51) Int. Cl.
*G06F 3/041* (2006.01)
*G09G 3/3275* (2016.01)

(52) U.S. Cl.
CPC .......... *G06F 3/0418* (2013.01); *G06F 3/0412* (2013.01); *G09G 3/3275* (2013.01); *G09G 2320/0626* (2013.01); *G09G 2370/22* (2013.01)

(58) Field of Classification Search
CPC ...... G06F 3/041; G06F 3/0412; G06F 3/0414; G06F 3/0416; G06F 3/0418; G06F 3/044; G06F 3/047
USPC ................................. 345/173–179
See application file for complete search history.

(56) References Cited

U.S. PATENT DOCUMENTS

| | | | |
|---|---|---|---|
| 8,907,921 B2 | 12/2014 | Reynolds | |
| 9,075,259 B2 | 7/2015 | Kim | |
| 9,182,847 B2 | 11/2015 | Lee et al. | |
| 9,275,611 B2 | 3/2016 | Kim | |
| 9,298,314 B2 | 3/2016 | Knausz et al. | |
| 9,329,725 B2 | 5/2016 | Pyo et al. | |
| 9,367,189 B2 | 6/2016 | Morein et al. | |
| 9,501,193 B2 | 11/2016 | Schwartz et al. | |
| 9,645,670 B2 | 5/2017 | Khazeni et al. | |
| 9,886,129 B2 | 2/2018 | Kim et al. | |

(Continued)

FOREIGN PATENT DOCUMENTS

| | | |
|---|---|---|
| KR | 20150078334 A | 7/2015 |
| KR | 20160005872 A | 1/2016 |

*Primary Examiner* — Ke Xiao
*Assistant Examiner* — Nelson Lam
(74) *Attorney, Agent, or Firm* — Leydig, Voit & Mayer, Ltd.

(57) ABSTRACT

A system and method for mitigating interference within a sensing device. The sensing device may be part of an input device that also includes a display device. The display device may include a display panel having a plurality of display electrodes, and a display driver configured to drive the plurality of display electrodes. The sensing device may include a plurality of sensor electrodes disposed over the display panel, and a sensor driver communicatively coupled to the plurality of sensor electrodes and the display driver. The sensor driver may be configured to acquire sensor data from the plurality of sensor electrodes, receive a display signal from the display driver, and reduce interference within the sensor data at least partially based on the display signal.

24 Claims, 7 Drawing Sheets

(56) References Cited

U.S. PATENT DOCUMENTS

| | | | |
|---|---|---|---|
| 9,946,404 B1 | 4/2018 | Berget et al. | |
| 2007/0040770 A1* | 2/2007 | Kim | G09G 3/3233 |
| | | | 345/76 |
| 2008/0157893 A1 | 7/2008 | Krah | |
| 2012/0139846 A1* | 6/2012 | Krah | G06F 3/044 |
| | | | 345/173 |
| 2013/0194229 A1* | 8/2013 | Sabo | G06F 3/0418 |
| | | | 345/174 |
| 2014/0015678 A1 | 1/2014 | Zribi et al. | |
| 2014/0015768 A1 | 1/2014 | Karpin et al. | |
| 2014/0049507 A1* | 2/2014 | Shepelev | G06F 3/0412 |
| | | | 345/174 |
| 2014/0306906 A1* | 10/2014 | Huang | G06F 3/0412 |
| | | | 345/173 |
| 2015/0002463 A1 | 1/2015 | Kanazawa | |
| 2015/0220206 A1 | 8/2015 | Knausz et al. | |
| 2016/0162074 A1* | 6/2016 | Huang | G06F 3/0443 |
| | | | 345/174 |
| 2016/0188034 A1 | 6/2016 | Bayramoglu | |
| 2017/0090671 A1 | 3/2017 | Khazeni et al. | |
| 2017/0123552 A1* | 5/2017 | Brunet | G06F 3/0418 |
| 2017/0192605 A1 | 7/2017 | Goudarzi et al. | |
| 2017/0364174 A1* | 12/2017 | Pedersen | G06F 3/04164 |
| 2018/0108717 A1* | 4/2018 | Seol | H01L 51/5237 |
| 2018/0239493 A1 | 8/2018 | Khazeni et al. | |
| 2018/0366081 A1* | 12/2018 | Jangda | G06F 3/0412 |
| 2019/0102017 A1* | 4/2019 | Kim | G06F 3/044 |
| 2020/0201475 A1 | 6/2020 | Mani et al. | |
| 2020/0401258 A1* | 12/2020 | Kang | G06F 3/04164 |

* cited by examiner

SYSTEM AND METHOD FOR REDUCING DISPLAY INTERFERENCE

CROSS REFERENCE

This application claims the benefit of U.S. provisional patent application Ser. No. 62/784,016, filed on Dec. 21, 2018 entitled "System and Method for Reducing Interference", which is herein incorporated by reference in its entirety.

BACKGROUND

Field

The disclosure herein is generally related to electronic devices, and more specifically, to reducing interference in input devices.

Description of the Related Art

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones.

SUMMARY

In one embodiment, an input device comprises a display device and a sensing device. The display device may include a display panel having a plurality of display electrodes, and a display driver configured to drive the plurality of display electrodes. Further, the sensing device may include a plurality of sensor electrodes disposed over the display panel, and a sensor driver communicatively coupled to the plurality of sensor electrodes and the display driver. The sensor driver may be configured to acquire sensor data from the plurality of sensor electrodes, receive a display signal from the display driver, and reduce interference within the sensor data at least partially based on the display signal.

A method for reducing effects of interference comprises acquiring, with a sensor driver, sensor data from a plurality of sensor electrodes, receiving, with the sensor driver, a display signal from the display driver, and adjusting the sensor data at least partially based on the display signal to reduce display interference. The plurality of sensor electrodes is disposed over a display panel of a display device.

In one embodiment, a processing system for input device comprises a display driver, and a sensor driver. The display driver is configured to drive a plurality of display electrodes of a display panel of a display device. The sensor driver is communicatively coupled to a plurality of sensor electrodes and the display driver. The sensor driver is configured to acquire sensor data from the plurality of sensor electrodes, receive a display signal from the display driver, and reduce interference within the sensor data at least partially based on the display signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
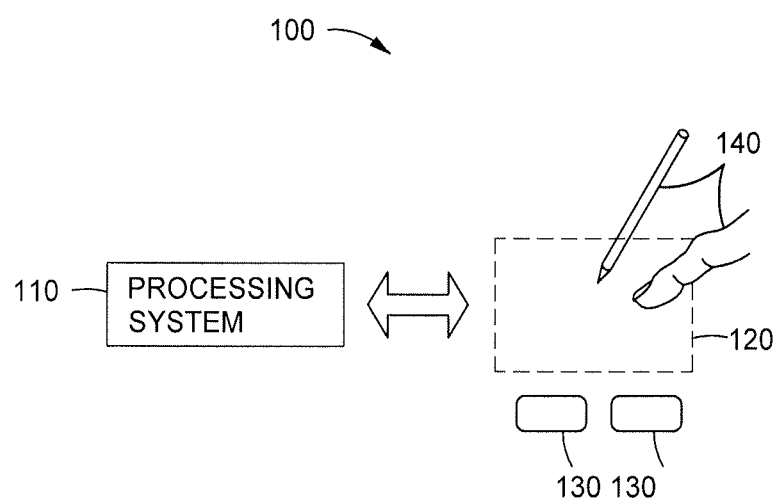
FIG. 1 is a schematic block diagram of an input device, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

An example input device 100 as shown in FIG. 1 in accordance with embodiments of the disclosure may be configured to provide input to an electronic system (not shown). As used in this document, the term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices, e.g., remote controllers and mice, and data output devices, e.g., display screens and printers. Other examples include remote terminals, kiosks, and video game machines, e.g., video game consoles, portable gaming devices, and the like. Other examples include communication devices, e.g., cellular phones such as smart phones, and media devices, e.g., recorders, editors, and players such as televisions, set-top boxes, music players, digital photo frames, and digital cameras. Additionally, the electronic system could be a host or a slave to the input device. The electronic system may also be referred to as electronic device.

The input device 100 can be implemented as a physical part of the electronic system, or can be physically separate from the electronic system. In one embodiment, the electronic system may be referred to as a host device. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device configured to sense input provided by one or more input objects 140 in a sensing region 120. Example input objects 140 include fingers and styli, as shown in FIG. 1. An exemplary proximity sensor device may be a touchpad, a touch screen, a touch sensor device and the like.

Sensing region 120 encompasses any space above, around, in and/or near the input device 100 in which the input device 100 is able to detect user input, e.g., user input provided by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiment's sense input that comprises: no contact with any surfaces of the input device 100; contact with an input surface, e.g. a touch surface, of the input device 100: contact with an input surface of the input device 100 coupled with some amount of applied force or pressure; and/or a combination thereof. In various embodiments, input surfaces may be provided by surfaces of casings within which the sensor electrodes (also referred to herein as sensing electrodes) reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images (e.g. of capacitive signals) that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (also often referred to as "absolute capacitance") sensing methods based on changes in the capacitive coupling between sensor electrodes and an input object (e.g. between a system ground and freespace coupling to the user). In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage, e.g. system ground, and by detecting the capacitive coupling between the sensor electrodes and input objects. In some implementations sensing elements may be formed of a substantially transparent metal mesh (e.g. a reflective or absorbing metallic film patterned to minimize visible transmission loss from the display subpixels). Further, the sensor electrodes may be disposed over a display of a display device. The sensing electrodes may be formed on a common substrate of a display device (e.g. on the encapsulation layer of a rigid or flexible organic light emitting diode (OLED) display). An additional dielectric layer with vias for a jumper layer may also be formed of a substantially transparent metal mesh material (e.g. between the user input and the cathode electrode 390). Alternately, the sensor may be patterned on a single layer of metal mesh over the display active area with cross-overs outside of the active area. The jumpers of the jumper layer may be coupled to the electrodes of a first group and cross over sensor electrodes of a second group. In one or more embodiments, the first and second groups may be orthogonal axes to each other. Further, in various embodiments, the absolute capacitance measurement may comprise a profile of the input object couplings accumulated along one axis and projected onto the other. In various embodiments, a modulated an input object (e.g. a powered active stylus) may be received by the orthogonal electrode axes without modulation of the corresponding electrodes (e.g. relative to a system ground). In such an embodiment, both axes may be sensed simultaneously and combined to estimate stylus position.

Some capacitive implementations utilize "mutual capacitance" (also often referred to as "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also referred to herein as "transmitter electrodes" or "transmitters") and one or more receiver sensor electrodes (also referred to herein as "receiver electrodes" or "receivers"). The coupling may be reduced when an input object coupled to a system ground approaches the sensor electrodes. Transmitter sensor electrodes may be modulated relative to a reference voltage, e.g., system ground, to transmit transmitter signals. Receiver sensor electrodes may be held substantially constant relative to the reference voltage or modulated relative to the transmitter sensor electrodes to facilitate receipt of resulting signals. A resulting signal may comprise effect(s) corresponding to one or more transmitter signals, and/or to one or more sources of environmental interference, e.g. other electromagnetic signals. Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) chips and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (in another embodiment, with associated firmware) separate from the central processing unit. As another example, the input device 100 may be physically integrated in a phone, and the processing system 110 may comprise circuits and firmware that are part of a main processor (e.g. a mobile device application processor or any other central processing unit) of the phone. In some embodiments, the processing system 110 is dedicated to implementing the input device 100. In other embodiments, the processing system 110 also performs other user input functions, such as operating display screens, measuring input forces, measuring tactile switch state, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system, e.g., to a central processing system of the electronic system that is separate from the processing system 110, if such a separate central processing system exists. In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. The filtering may comprise one or more of demodulating, sampling, weighting, and accumulating of analog or digitally converted signals (e.g. for FIR digital or IIR switched capacitor filtering) at appropriate sensing times. The sensing times may be relative to the display output periods (e.g. display line update periods or blanking periods). As yet another example, the processing system 110 may subtract or otherwise account for a baseline, such that the information reflects a difference between the electrical signals from user input and the baseline signals. A baseline may account for display update signals (e.g. subpixel data signal, gate select and deselect signal, or emission control signal) which are spatially filtered (e.g. demodulated and accumulated) and removed from the lower spatial frequency sensing baseline. Further, a baseline may compensate for a capacitive coupling between the sensor electrodes and one or more nearby electrodes. The nearby electrodes may be display electrodes, unused sensor electrodes, and or any proximate conductive object. Additionally, the baseline may be compensated for using digital or analog means. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of a display screen. For example, the sensing region 120 may overlap at least a portion of an active area of a display screen (or display panel). The active area of the display panel may correspond to a portion of the display panel where images are updated. In one or more embodiments, the input device 100 may comprise substantially transparent sensor electrodes (e.g. ITO, metal mesh, etc.) overlaying the display screen and provide a touch screen interface for the associated electronic system. The display panel may be any type of dynamic display capable of displaying a visual interface to a user, and may include any type of light emitting diode (LED), OLED, cathode ray tube (CRT), liquid crystal display (LCD), plasma, electroluminescence (EL), or other display technology. The input device 100 and the display panel may share physical elements. For example, some embodiments may utilize some of the same electrical components for displaying and sensing. As another example, the display panel may be operated in part or in total by the processing system 110.

A cathode electrode of an OLED display may provide a low impedance screen between the display update signals and the sensor electrodes separated by a thin encapsulation layer. For example, the encapsulation layer may be about 10 um. Alternatively, the encapsulation layer may be less than 10 um or greater than 10 um. Further, the encapsulation layer may be comprised of a pin hole free stack of conformal organic and inorganic dielectric layers.

It should be understood that while many embodiments of the disclosure are described in the context of a fully functioning apparatus, the mechanisms of the present disclosure are capable of being distributed as a program product, e.g., software, in a variety of forms. For example, the mechanisms of the present disclosure may be implemented and distributed as a software program on information bearing media that are readable by electronic processors, e.g., non-transitory computer-readable and/or recordable/writable information bearing media readable by the processing system 110. Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
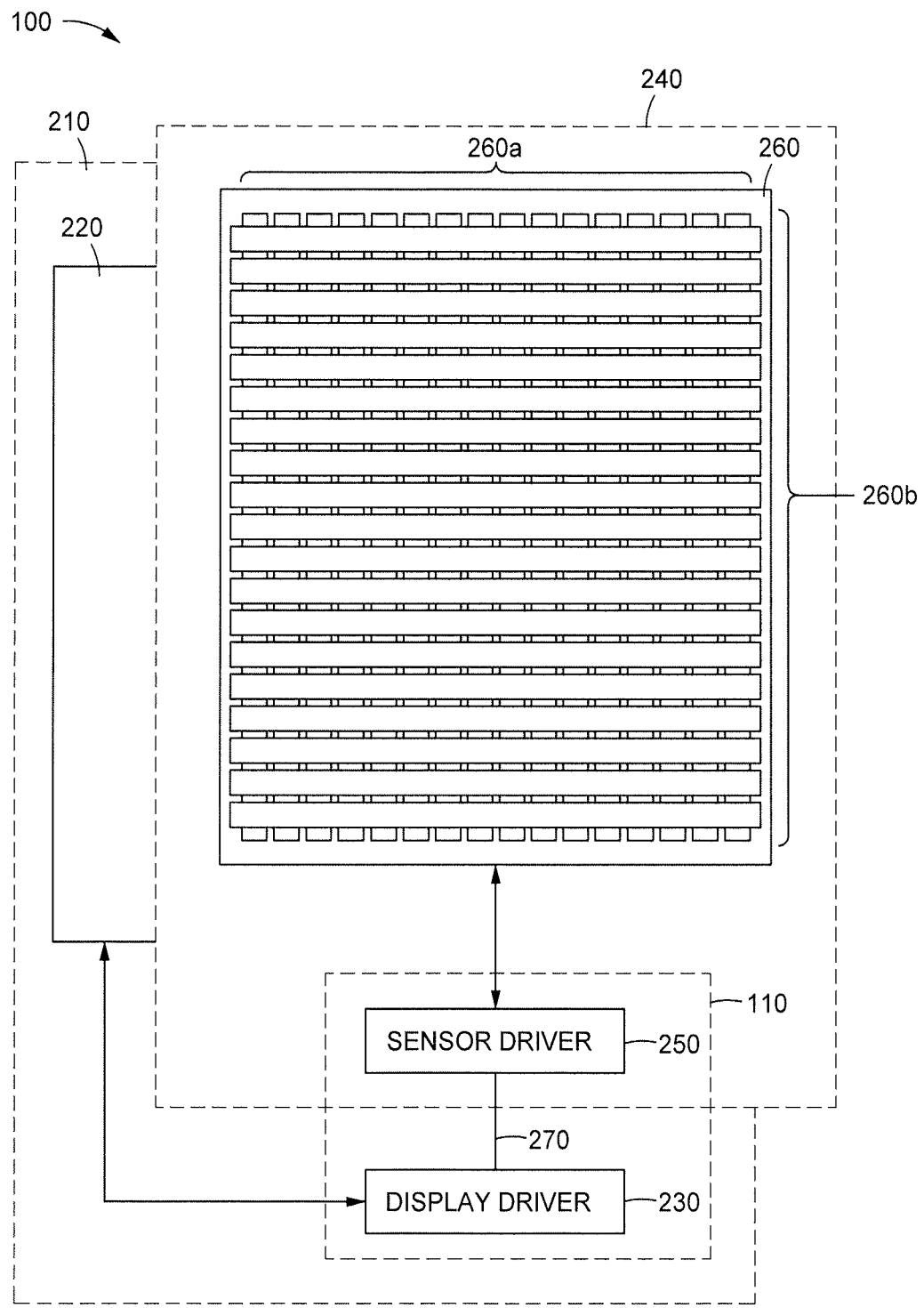
FIG. 2 illustrates an example display device and sensor device, according to one or more embodiments.

FIG. 2 illustrates an example embodiment of input device 100. As is illustrated, the input device 100 includes display device 210 and sensing device 240. The display device 210 includes display panel 220 communicatively coupled with display driver 230. The sensing device 240 includes sensor electrodes 260 communicatively coupled with the sensor driver 250.

In one or more embodiments, processing system 110 may comprise one or more of display driver 230 and sensor driver 250. In one embodiment, processing system 110 includes both of display driver 230 and sensor driver 250. Further, the display driver 230 may be part of a first IC chip and the sensor driver 250 may be part of a second IC chip. In other embodiments, the display driver 230 and the sensor driver 250 are disposed on a common IC chip.

In one embodiment, display device 210 may be organic light emitting diode (OLED) display comprising a plurality of subpixels. Each subpixel includes display circuitry, and is coupled to a source electrode (may also be referred to as a source line, data line or a data electrode) and a gate electrode (may also be referred to as a gate line or a line selection electrode). The display circuitry, the source electrode and the gate electrode that are configured to control updating each of the subpixels.

Figure 3A:
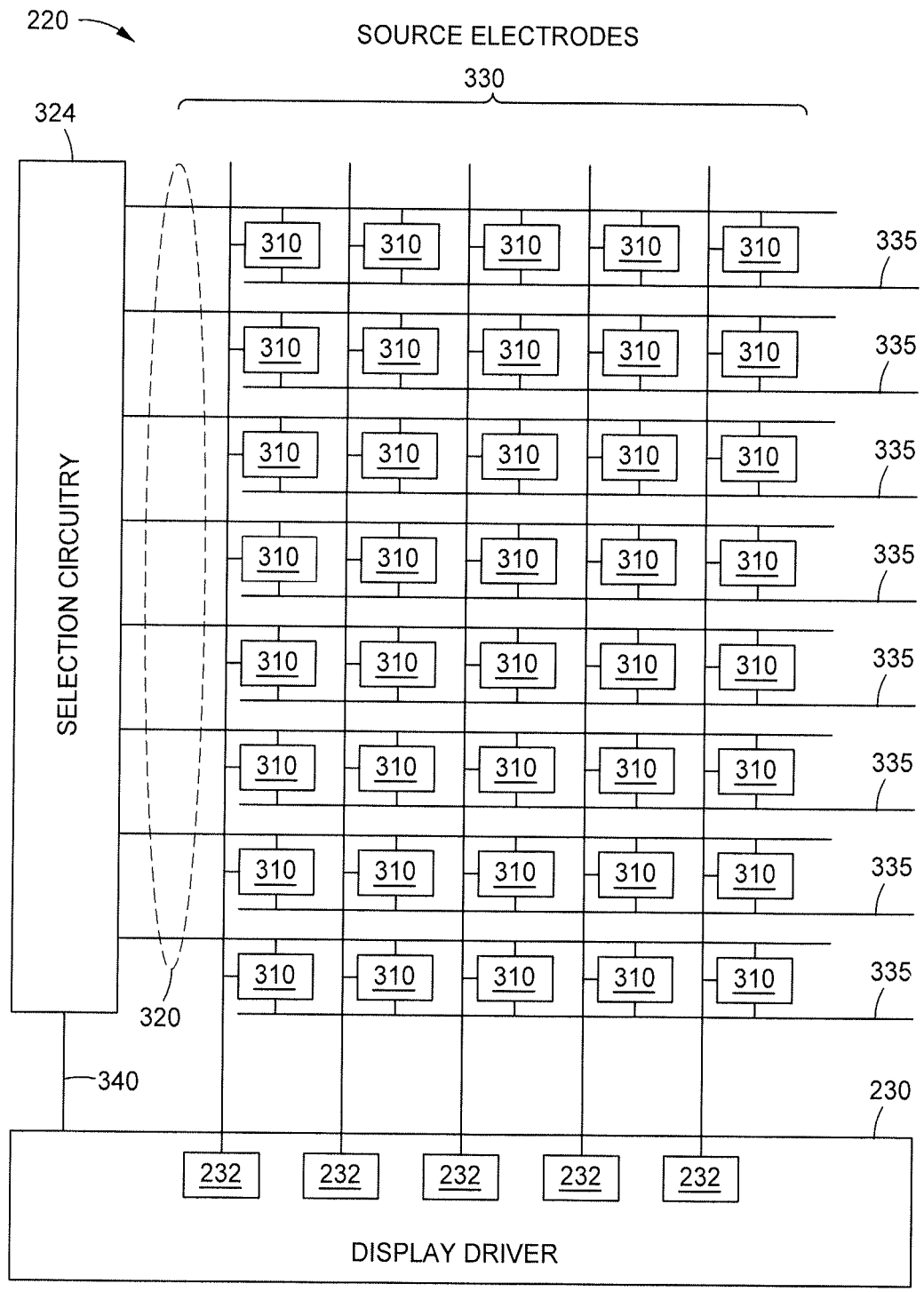
FIG. 3A is a top view of a portion of an example display device, according to one or more embodiments.

For example, FIG. 3A illustrates a top view of a portion of display panel 220 where each subpixel 310 is coupled to a gate electrode 320 and a source electrode 330. In one embodiment, selection circuitry 324 is configured to drive gate select and gate deselect signals on to the gate electrodes 320 to select (active) and deselect (deactivate) the subpixels 310 for updating. The gate select signal may be referred to a gate high signal or $V_{GH}$ and the gate deselect signal may be referred to a gate low signal or $V_{GL}$. In one embodiment, $V_{GH}$ is a positive voltage and $V_{GL}$ is a negative voltage.

Further, $V_{GH}$ and $V_{GL}$ correspond to the turn-on and turn-off voltages of the transistors of the subpixels configured to control activation and deactivation of the subpixels. In one example embodiment, $V_{GH}$ is about 15 V and $V_{GL}$ is about −10 V. However, other voltages may be used. Each of the gate electrodes 320 may be coupled to a respective one or more of the rows of subpixels. In one or more embodiments, at least two gate electrodes 320 are coupled to subpixel of a common row (e.g. adjacent lines n−1, n, n+1).

The gate line signals may be controlled by gate selection circuitry. The gate selection circuitry may include one or more shift registers and may be coupled to the display driver 230. The display driver 230 may provide one or more clock signals to the gate selection circuitry, and the gate selection circuitry may utilize the one or more clock signal to select and deselect gate electrodes for updating. The clock signals may be also, or alternatively, utilized to control display line update timing and/or display frame blanking timing. Further emission control signals may be generated by similar emission control shift register circuitry. The emission control circuitry may be controlled via one or more clock signals provided by the display driver 230. The emission control circuitry may include one or more shift registers. Additionally, the emission control circuitry may be coupled to emission control lines 335. In one or more embodiments, the emission control electrodes may be arranged parallel to the gate electrodes (e.g. alternating with gate electrodes) and perpendicular to the source electrodes.

The gate selection circuitry and/or the emission control circuitry may be disposed along one or more edges of the display panel 220. For example, the gate selection circuitry may be disposed along a first edge and the emission control circuitry may be disposed along a second edge of the display panel 220.

Each of the source electrodes 330 are coupled to a column of subpixels and are configured to drive a subpixel data signal onto each of the subpixels. For example, a subpixel that has been selected for updating by selection circuitry 324 may be driven with a subpixel data signal by the display driver 230 via a corresponding one of the source electrodes 330. In one embodiment, the subpixel data signal is a voltage signal. The source electrodes may also be referred to sub-pixel data lines.

Each of the source electrodes 330 may be simultaneously driven with a corresponding subpixel data signal to simultaneously update each selected (e.g., activated) subpixel along a selected gate electrode. The display driver 230 may include source drivers 232 that are each coupled to a respective one of source electrodes 330. The source drivers 232 may include one or more amplifiers, DACs, buffers, and other drive circuitry configured to drive a corresponding voltage signal on to an activated subpixel. The drive circuitry may include one or more linear or non-linear digital to analog converters. In one or more embodiments, the display driver 230 may additionally include hardware and firmware elements configured to receive display data from a host device (e.g. through LVDS, MIPI, DisplayPort, etc.), and process the display data to generate the subpixel data signals. The subpixel data lines may be driven on the source electrodes 330 to update the subpixels 310. For example, the display driver 230 may include a mobile industry processor interface (MIPI) receiver. Further, the display driver 230 may include a timing control circuitry configured to generate timing signals used for updating the display panel. The timing signals may include selection circuitry clock signals. Further, in various embodiments, the display driver 230 may include a full or partial frame buffer to store display data along with associated compression and decompression circuitry. In display devices that use subpixel rendering the display driver 230 may include circuitry to convert display data (e.g. directly from MIPI in video mode or from a compressed frame buffer in command mode) to update the displayed image with a reduced number of source drivers while retaining similar visual performance. In various embodiments, two common examples of subpixel rendering include "pentile" RGBG and "delta" (or "triad") RGB subpixel arrangements with 2 subpixels per pixel.

In one embodiment, the period corresponding to when each subpixel coupled to a gate electrode 320 and/or in a common row is updated may be referred to a display line update period. Further, each row of subpixels may be referred to as a display line (e.g. selected by a gate electrode). The portion the display selected for update may zig-zag or be coupled alternate sides of a gate electrode to cover various subpixel arrangements. One or more gate electrodes may be utilized to select the portion of display for updating. Further, a column may be connected to a single source electrode which may zig-zag over the display panel or alternate sides of the source electrode may provide connections to provide updates for a particular pattern of the subpixel 310.

In one embodiment, the display panel 220 includes more source electrodes than gate electrodes. For example, a landscape high definition display panel may include about 1080 gate electrodes and about 5760 source electrodes without SPR (subpixel rendering). The number of gate electrodes and source electrodes may correspond to the resolution and/or orientation (e.g. portrait or landscape) of the display panel, and the orientation of subpixels within the display panel along with any subpixel rendering used. For example a WQHD SPR portrait display might use 2560 gate electrodes and 2880 total source electrodes.

In one embodiment, selection circuitry 324 may share an IC chip with display driver 230. In other embodiments, the selection circuitry 324 may be disposed within a first IC chip and the display driver 230 may be disposed within a second IC chip. In such embodiments, a synchronization mechanism 340 may be used to communicate signals between display driver 230 and selection circuitry 324. The signals may include control signals and/or timing signals that provide an indication as to which gate electrode 320 to select for display updating and/or when to being and/or pause driving selecting gate electrodes 320 for updating (e.g. clocking signals, reset/clear signals, etc.) for a shift register using the panel TFT layers.

Figure 3B:
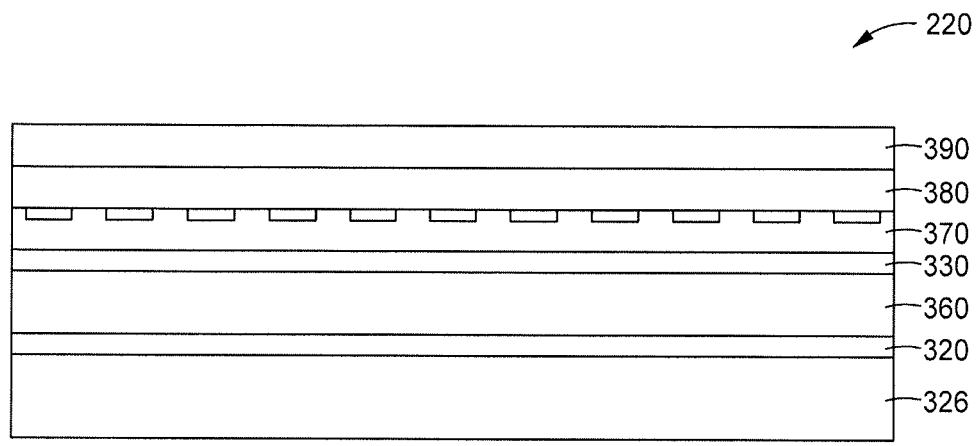
FIG. 3B is a side view of a portion of an example display device, according to one or more embodiments.

FIG. 3B is an example partial side view of the display panel 220. In the illustrated embodiment, the display panel 220 includes substrate 326, the gate electrodes 320, the source electrodes 330, subpixel circuitry 360 (e.g. TFT), anode electrodes 370, organic layers 380 and cathode electrode 390. In one embodiment, the gate electrodes 320 and source electrodes 330 may be disposed within different metal layers, and the position of those metal layers may differ from what is shown in FIG. 3B. For example, in different embodiments, gate electrodes 320 may be deposed in a metal layer either above or below the metal layer of source electrodes 330.

The substrate 326 may be a glass substrate or a plastic substrate. In one embodiment, the substrate 326 is substantially rigid. In other embodiments, substrate 326 is flexible. Further, a display panel may be manufactured and initially patterned and processed as a sheet on a rigid substrate before singulation and release for assembly into a display module via a flexible substrate 326.

The subpixel circuitry 360 comprises two or more transistors configured to control the activation and deactivation of each subpixel 310 and current flow through each subpixel 310 for updating of subpixel 310. The subpixel circuitry 360 for each subpixel is coupled to a corresponding gate electrode 320, source electrode 330 and anode electrode 370. Further, the subpixel circuitry 360 may be configured to control the flow of current onto a corresponding anode electrode 370 from a cathode 390 through an OLED. In one embodiment, the subpixel circuitry 360 for a subpixel is configured to couple a corresponding anode electrode 370 with the subpixel data signal on a corresponding source electrode 30. For example, the subpixel circuitry controls the voltage across a storage capacitor of a corresponding subpixel, and the storage capacitor controls the transistor (e.g., drive) current of the subpixel circuitry. Further, the subpixel circuitry 360 for a subpixel may be configured to couple a corresponding anode electrode 370 with an initialization voltage before coupling a corresponding anode electrode 370 with the subpixel data signal. The subpixel circuitry 360 may be composed of one or more Thin Film Transistors (TFT). The TFTs may be formed of one or more of low temperature poly-silicon, Oxide semiconductors, or amorphous Silicon materials. Further, the subpixel circuitry 360 may include one or more emission control transistor(s) configured to isolate a corresponding OLED to prevent current flow during the subpixel update process. Updating the subpixels may include charging of the corresponding storage capacitor and/or offset compensation pixel circuitry. IN various embodiments, isolation may be provided by the emission control lines 335.

The cathode electrode 390 may be a sheet of resistive material configured to overlap one or more of the subpixels 310. In one embodiment, the display panel 220 includes a single cathode electrode 390 that is disposed over each of the subpixels 310. In one or more embodiment, the cathode electrode 390 is a resistive sheet having a resistance of about 1 to about 20 ohms per square. The cathode electrode 390 may be coupled with and driven by the display driver 230 to supply a low impedance reference voltage. In one embodiment the voltage across a subpixel and the current to the cathode electrode 390 from the anode electrode 370 corresponds to the amount of light that is emitted by each subpixel. The current may be controlled by one or more field effect transistors (e.g. as a controlled current source) to minimize the effect of any variation in diode forward voltage, or resistive supply voltage drop in the display panel 220. Further, the cathode electrode 390 is electrically separated from the anode electrode 370 by one or more organic layers 380, forming the OLEDs.

In one embodiment, the display driver 230 utilizes an emission control signal to control the brightness, or control the dimming, of each subpixel 310. For example, the emission control signal may be a pulse width modulated (PWM) signal, and the brightness of each subpixel 310 may correspond to a duty cycle of the PWM signal. In one embodiment, the greater the duty cycle of the emission control signal, the brighter each of the subpixels will be. For example, for an emission control signal having a duty cycle of 50%, the resulting brightness for each of the subpixels will be about 50% of the maximum brightness (e.g. for 100% duty cycle). In one embodiment, the emission control signal is driven onto each emission control line 335 coupled in a scanning fashion such that one or more rows of subpixels 310 are driven at a time with emission control signal. For example, the emission control signals may be driven by emission control circuitry by clocking the shift register or registers of the emission control signal with a clock signal to deselect display lines. Typically the emission control shift register is clocked at the same rate as the gate selection shift register. Clocking the shift registers may be referred to as applying "walking ones" to the shift register or registers of the emission control circuitry. Further, deselecting the display lines with the emission control circuitry may stop current from flowing through the display line(s). Further, in various embodiments, a first emission control signal may be driven onto a first group of subpixels 310 via a corresponding first group of emission control lines 335 and a second emission control signal may be driven onto a second group of subpixels 310 via a corresponding second group of emission control lines 335. In other embodiments, more than two groups of consecutive subpixels of subpixels 310 and corresponding groups of consecutive emission control lines 335 may be utilized. For example, consecutive subpixels may be driven by a common shift register of the emission control circuitry clocked by the display driver 230 to increase the "flicker" frequency of the PWM, and reduce "flicker" visibility.

In one embodiment, the display driver 230 is configured to increase and/or decrease the brightness of the display panel by increasing and/or decreasing the duty cycle of the emission control signal. Further, by scanning the emission control signal across the display rows display artifacts may be reduced.

The display driver 230 is configured to update subpixels 310 to update an image displayed on the display panel 220 during display frames. The display frames may be updated, or refreshed, once about every 16 ms, generating a display refresh rate of about 60 Hz. In other embodiments, other display refresh rates may be employed. For example, the display refresh rate may be 90 Hz, 120 Hz, 240 Hz, or greater. Also, it may be updated at 15 Hz or lower frequencies to reduce power in embodiments when display data is not needed to change quickly with user input. In one embodiment, each display frame includes one or more subframes.

The display driver 230 may generate timing signals such as a vertical sync (VSYNC) signal to start and/or end a display frame. In one embodiment, the VSYNC signal is provided to selection circuitry 324 to provide an indication to the selection circuitry 324 to begin selection of the gate electrodes 320 for display updating. In one embodiment, the VSYNC signal may additionally or alternatively identify one or more vertical blanking periods within a display frame. For example, the VSYNC signal may be utilized to reset one or more shift registers of the selection circuitry.

The display driver 230 may additionally generate a timing signal such as a horizontal sync (HSYNC) signal that corresponds to the start of a display line update period and/or to an end of a display line update period. An end of a display line update period may correspond to a cycle of the gate selection circuitry clock control signals provided by the display driver 230 and a transition to a new voltage on a data line. The display driver 230 may output HSYNC signal to selection circuitry 324 to control selection and deselection of gate electrodes 320. Similarly, multiplexing selection signals may be provided to source multiplexing circuitry where multiple data lines are driven by a single multiplexed line buffer. In one embodiment, the horizontal sync signal may additionally or alternatively identify one or more blanking periods that correspond to a display line update period.

In one embodiment, the display driver 230 utilizes a timing signal such as a display enable signal that may be a composite signal of both the HSYNC and VSYNC signals, and may identify the start time of a display frame, an end time of a display frame, horizontal blanking periods corresponding to a display line update period, and/or vertical blanking periods within a display frame. In one embodiment, only a portion of the subpixels 310 may be updated during each display frame. For example, the portions of the subpixels 310 determined to have not changed from display frame to display frame may not be updated.

Figure 4:
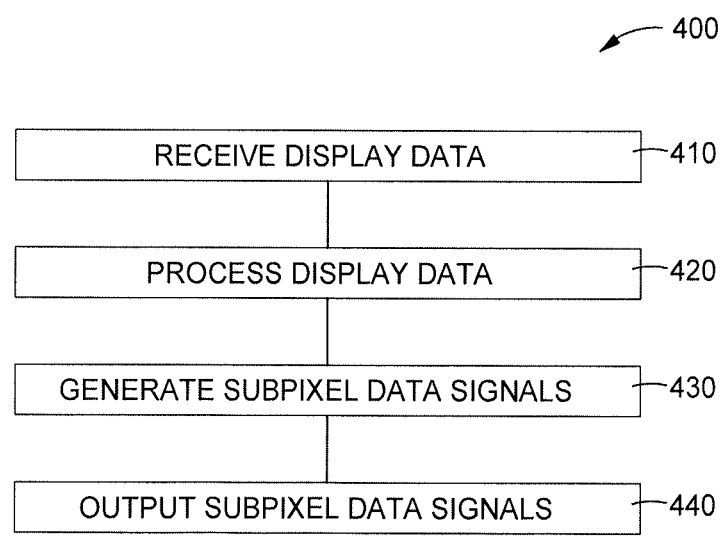
FIG. 4 illustrates a method for determining subpixel data signals, according to one or more embodiments.

FIG. 4 illustrates an example method 400 for receiving display data and generating display update signal, in accordance with embodiments. At step 410, the display driver 230 receives display data from a host device. In one embodiment, the display data is in the form of a MIPI signal, and a MIPI receiver of the display driver 230 is configured to receive the MIPI signal. The display data may be encoded and compressed pixel data. At step 420, the display driver 230 processes the display data. For example, the display driver 230 may be configured to decompress, scale, performing image processing steps, adjust the gamma of the display data, and configure the display update signals (e.g., subpixel data signals, source multiplexing signals, gate select and deselect signals, and/or emission control signals). In one or more embodiments, configuring the display update signals comprises at least one of setting brightness levels (e.g. through Digital Brightness Value (DBV)), applying local area auto current control, managing subpixel rendering, and correcting for Mura effects. The display driver 230 may also configure the display update signals to reduce power consumption based on a range of brightness levels. For example, the power reduction may correspond to a reduction in the drive voltage range or number of voltage levels. The voltage range of the subpixel data may be controlled by a gamma circuit (e.g. analog non-linear DAC or digital linear DAC) to provide the correct input data to output luminosity scaling (e.g. sRGB Gamma) for each subpixel color of the display.

At step 430, the display driver 230 generates analog subpixel data signals from the processed digital display data. For example, the display driver 230 may convert the processed display data into analog signals configured to be driven onto the source electrodes as subpixel data signals using a digital-to-analog converter (DAC). At step 440 the display driver 230 outputs the subpixel data signals onto source electrodes via source drivers 232 (e.g. voltage buffers). In one or more embodiments, multiple buffers may be multiplexed to drive a single output pad of the display driver 230 (e.g. to cover different voltage ranges of the subpixels, or to reduce average voltage error by averaging neighboring buffers, etc.).

With further reference to FIG. 2, sensing device 240 includes sensor electrodes 260 and sensor driver 250. The sensor driver 250 may include hardware and firmware elements configured to drive the sensor electrodes 260 to acquire sensor data and to process the sensor data to determine changes in capacitive coupling and/or positional information for an input object. For example, the sensor driver 250 may include receiver circuitry configured to receive resulting signals from one or more of the sensor electrodes 260 and transmitter circuitry configured to drive sensing signals onto one or more of the sensor electrodes 260 for capacitive sensing. The transmitter circuitry may include one or more amplifiers configured to drive sensing signals onto sensor electrodes. The amplifiers may correspond to one or more buffers or modulators. Further, the receiver circuitry may include analog front ends (AFEs) configured to receive resulting signals from sensor electrodes.

In one embodiment, receiving the resulting signals may comprise sampling the resulting signals to generate one or more samples. Further, receiving the resulting signals may comprise one or more of accumulating charge, compensating for an analog sample baseline by removing charge, and resetting or demodulating the accumulator between samples. Additionally, or alternatively, receiving the resulting signals may comprise one or more of weighting and filtering corresponding samples and compensating for a digital baseline by removing a digital sample baseline. The analog and digital baseline compensation may be based upon one or more of the display update signals driven temporally coincident with receiving the resulting signals. The compensation may be applied to the receiver circuitry or the transmitter circuitry of the sensor driver 250. For example, the compensation may be applied by a DAC to the AFE or AFEs of the receiver circuitry of the of the sensor driver 250. Alternatively, or additionally, the compensation may be applied by a DAC to the references of an ADC of the receiver circuitry. The sensor driver 250 may be configured to acquire sensor data from the sensor electrodes by operating the sensor electrodes for capacitive sensing. The sensor data may correspond to resulting signal received with one or more sensor electrodes.

In one embodiment, a first portion of the sensor electrodes may be driven with transmitter signals such that they are operated as transmitter electrodes, and a second portion of the sensor electrodes may be utilized to receive resulting and signals such that they operated as receiver electrodes, to perform transcapacitive sensing. For example, the sensor electrodes 260a may be operated as transmitter electrodes and the sensor electrodes 260b may be operated as receiver electrodes. In another example, the sensor electrodes 260b may be operated as transmitter electrodes and the sensor electrodes 260a may be operated as receiver electrodes.

In one embodiment, the sensor driver 250 is configured to drive the transmitter electrodes with a transmitter signal that is modulated relative to the receiver electrodes. For example, the transmitter signal may be a varying voltage signal that varies between at least two voltages. In one embodiment, the transmitter signal includes a plurality of sensing bursts. Further, each sensing bursts includes a plurality of voltage transitions and a plurality of resulting signals to generate at least one sample. The sensor driver 250 may be configured to maintain the receiver electrodes at a substantially constant voltage (e.g. relative to system ground) or modulate the receiver electrodes when performing capacitive sensing. In one embodiment, when the receiver electrodes are modulated (e.g. relative to system ground), the transmitter electrodes are modulated relative to the receiver electrodes, such that the transmitter electrodes are modulated at a different phase, polarity, amplitude, and/or frequency than the receiver electrodes. The sensor driver 250 receives resulting signals with the receiver electrodes and measures the resulting signals to determine a change in capacitive coupling between the receiver electrodes and the transmitter electrodes. In another embodiment, when the receiver electrodes are modulated (e.g. relative to system ground), the transmitter electrodes may be modulated similar to the receiver electrodes, such that the transmitter electrodes are modulated to guard the receiver electrodes and minimize coupled charge from the transmitter electrodes to the receiver electrodes. In one embodiment, the substantially constant voltage may be a panel power supply voltage (e.g. Cathode voltage). The reference cathode voltage may be measured at one or more tap points with a high impedance buffer such that resistive effects of the tap contact and routing do not cause a significant error in the measurement. In various embodiments, where the cathode of an OLED display is a relatively low resistance sheet (e.g. a thin substantially transparent silver metal layer, etc.) the voltage on the Cathode within the active area may be estimated by measuring at one or more tap points on the perimeter, and may be used to compensate interference caused by touch AFE coupling to the Cathode (e.g. compensating AFE reference voltages in analog, or compensating the output of an AFE ADC digitally).

The sensor driver 250 may be configured to drive each of the transmitter electrodes one at a time, or simultaneously drive at least two of the transmitter electrodes. In one embodiment, the sensor driver 250 is configured to simultaneously drive at least two transmitter electrodes with different transmitter signals based on different codes or frequencies. For example, multiple transmitter electrodes may be simultaneously driven with transmitter signals which are modulated with substantially orthogonal coded sequences (e.g. amplitude shifted, phase shifted, frequency shifted). The corresponding resulting signals may be decoded to independently measure the coupling of between the transmitter electrodes and the receiver electrodes.

In another embodiment, the sensor electrodes 260 are operated for absolute capacitive sensing by sensor driver 250. In such an embodiment each of the sensor electrodes 260 may be modulated relative to a reference voltage (e.g., system or device ground, cathode voltage, etc.) with an absolute capacitive sensing signal by the sensor driver 250, and the sensor driver 250 receives resulting signals from the modulated sensor electrodes. In one embodiment the entire OLED display power supply may be modulated by modulating an OLED PMIC (Power Management IC) reference voltage relative to system ground. The sensor driver 250 may be configured to determine changes in a capacitive coupling between each modulated sensor electrode and an input object, such as input object 140, from the resulting signals. In one embodiment, all of sensor electrodes 260 may be simultaneously operated for absolute capacitive sensing, such that a different resulting signal is simultaneously received from each of the sensor electrodes or a common resulting signal from two or more sensor electrodes. In another embodiment, the sensor electrodes 260a may be operated for absolute capacitive sensing during a first period and sensor electrodes 260b may be operated for capacitive sensing during a second period that is non-overlapping with the first period. For example, to allow sharing of receiver circuitry between the two sets of sensor electrodes 260a and 260b, the sensor electrodes 260a and 260b may be operated for absolute capacitive sensing during non-overlapping periods. When the sensor electrode 260a, 260b are not operated for absolute capacitive sensing, the sensor electrodes may be modulated with a guard signal to minimize charge coupling between the sensor electrodes operated for absolute capacitive sensing and the sensor electrodes not operated for absolute capacitive sensing. The guard signal and the absolute capacitive sensing signal may be similar in at least one of phase, amplitude and polarity. Further, one or more of the sensor electrodes 260a, 260b may be over-guarded to subtract excess charge from the other set. Over-guarding may include driving one or more of the sensor electrodes 260a, 260b with a guard signal having a similar phase to the absolute capacitive sensing signal, but with a larger amplitude than the absolute capacitive sensing signal.

In various embodiments, the sensor electrodes 260 may be substantially rectangular in shape. In other embodiments, the sensor electrodes may have other shapes (e.g. connected diamond shapes, connected hexagons, etc.). Further, each of the sensor electrodes 260 may have the same shape and/or size. In other embodiments, at least one sensor electrode on one axis may have a different shape and/or size than another sensor electrode on another axis (e.g. to reduce user input coupled interference on one axis). For example the sensor electrodes 260 may be diamond shaped, have interdigitated fingers to increase field coupling, and/or have floating cutouts inside to reduce stray capacitance to the display panel 220 and increase input device ground coupling. Further, the sensor electrodes may be routed in two or more layers (e.g. crossing with jumpers, or routing in one layer with user input coupling electrodes substantially formed in a second layer), or within a single layer (e.g. jumpered or multiplexed outside of the active area of the display panel 220).

Figure 5A:
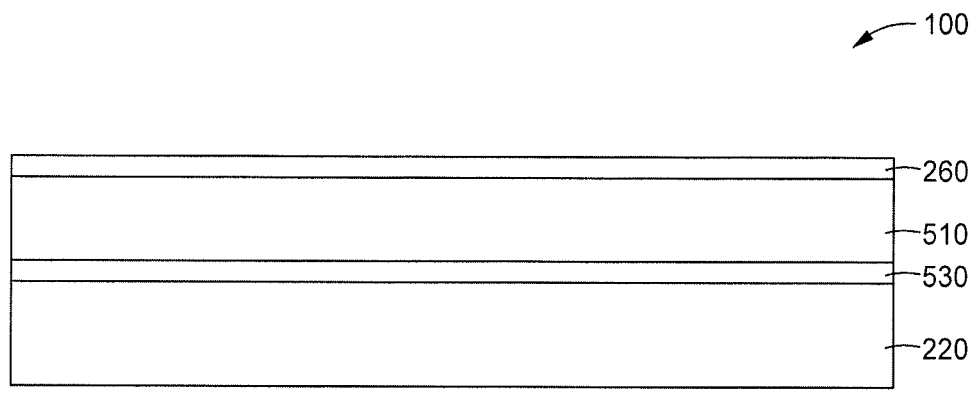
FIGS. 5A, 5B, 5C and 5D illustrate side views of example input devices, according to one or more embodiments.

The sensor electrodes 260 may be disposed on a lens of display panel 220. For example, as illustrated in FIG. 5A, sensor electrodes 260 are disposed on lens 510 of display panel 220. In one embodiment, each of the sensor electrodes 260 may be disposed on directly on a common substrate which is adhered to lens 510. Further, the sensor electrodes 260 may be disposed in a common layer. For example, the sensor electrodes 260 may be disposed in an array, where the sensor electrodes do not intersect with each in the sensing area of the sensing device 240. Alternatively, one of sensor electrodes 260a and 260b may include jumpers patterned on a separate layer which interconnect sensor electrodes 260a or 260b and crossover respective ones of the other one of sensor electrodes 260a and 260b. The jumpers are insulated from the sensor electrodes that they crossover such that they don't ohmically couple to those sensor electrodes.

Figure 5B:
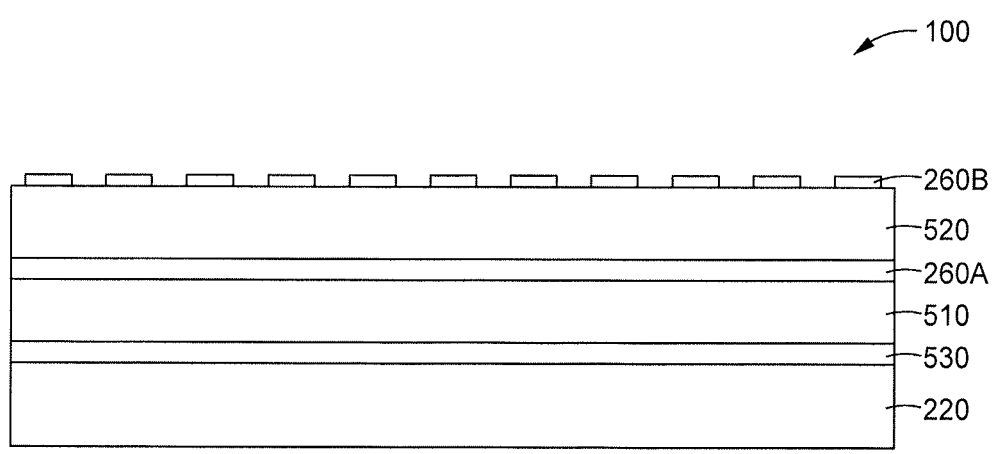

Alternatively, sensor electrodes 260a may be disposed on a first layer, and sensor electrodes 260b may be disposed on a second layer different from the first layer. For example, as illustrated in FIG. 5B, the sensor electrodes 260a may be disposed on the lens 510, or any other substrate of the display panel 220, and sensor electrodes 260b may be disposed on substrate external to the display panel (e.g., substrate 520). In such an embodiment, the external substrate may be adhered to the lens 510 of the display panel 220, or another substrate of the display panel 220, by an optically clear adhesive (OCA). Alternatively, in one embodiment, sensor electrodes 260a may be disposed on substrate 520 and sensor electrodes 260b may be disposed on lens 510.

In one embodiment, sensor electrodes 260a and 260b may be disposed on different sides or a common side of a substrate (e.g., substrate 520) which is then adhered to the display panel 220. For example, the sensor electrodes 260a and 260b may be disposed on different sides of substrate 520, and substrate 520 may be adhered to the lens 510, the encapsulation layer 530 or any other substrate within the display panel 220. In another embodiment, sensor electrodes 260a are disposed on a first substrate and sensor electrodes 260b are disposed on a second substrate, and both substrates are then both coupled to display panel 220. For example, the first and second substrates may be adhered to the lens 510, the encapsulation layer 530 or any other substrate within the display panel 220.

In one or more embodiments, the display device 200 of FIGS. 5A and 5B includes an encapsulation layer 530 in addition to the lens 510. The encapsulation layer 530 may be rigid or at least partially flexible. For example, the encapsulation layer 530 may include one or more layers of thin flexible materials (e.g. polymer, Silicon Nitride, Silicon OxyNitride). In other embodiments, the encapsulation layer 530 may be comprised of one or more substantially rigid materials (e.g. glass). The encapsulation layer 530 may be disposed such that the organic layers 380 are between the encapsulation layer 530 and substrate 520. In various embodiments, the lens 510 may also be composed of thin flexible layers to conform to the display panel 220 or to allow bending of the integrated touch and display stack.

While FIGS. 5A and 5B illustrate the sensor electrodes 260 disposed on a substrate attached to the lens 510 or on the lens 510, the sensor electrodes 260 may alternatively, or additionally, be disposed on a circular polarizing filter of the display panel 220, where the circular polarizing filter is utilized to minimize reflections from the display panel 220. Alternatively, the sensor electrodes 260 may be disposed on a non-birefringent substrate (e.g. Cyclo-Olefin Polymer) below the circular polarizer filter or other sensor substrate such as PET (Poly Ethelene Terephthalate) above the polarizer. Further, the sensor electrodes 260 may be disposed on the same substrate as the display active matrix and/or on or above an encapsulation layer of the display panel.

Figure 5C:
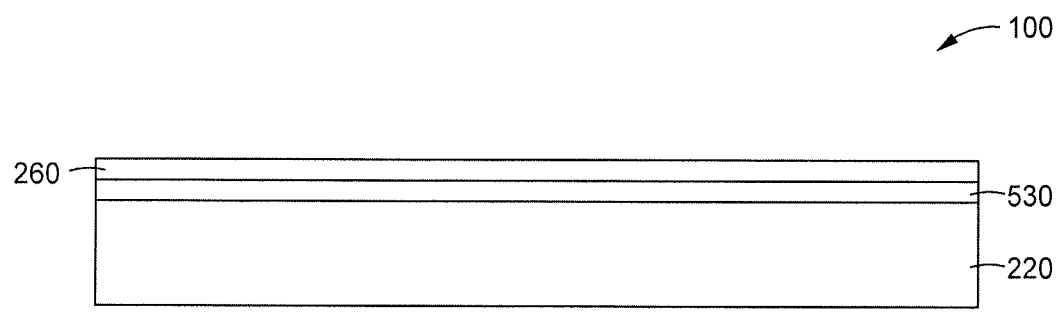
Figure 5D:
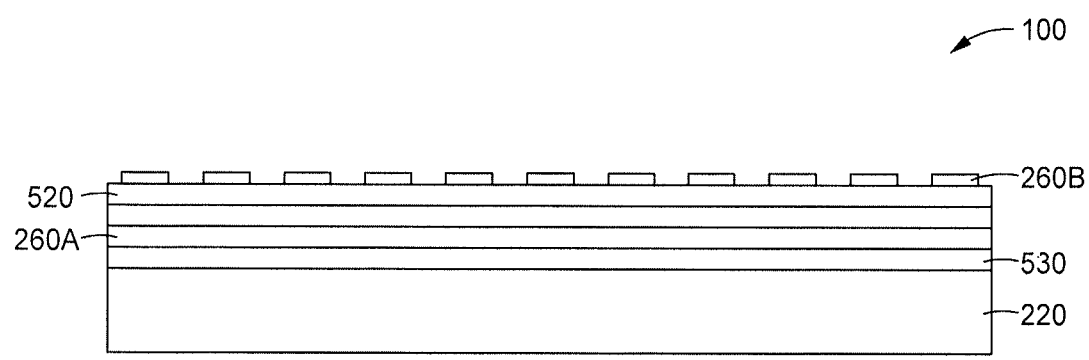

FIGS. 5C and 5D illustrate the sensor electrodes 260 disposed directly on the encapsulation layer 530 (FIG. 5C), or on the substrate 520 which is adhered to the encapsulation layer 530 (FIG. 5D), in accordance with one or more embodiments. While not illustrated, a lens (e.g., lens 510) may be disposed above the sensor electrodes 260, such that the sensor electrodes are disposed between the lens 510 and the encapsulation layer 530. In various embodiments, where the sensor electrodes are metal mesh electrodes on the encapsulation layer, the sensor electrodes may be patterned and aligned to avoid obstructing the view of the electro luminescent OLED layer illuminating the subpixels 310. In various embodiments, the encapsulation layer is 10 um thick. In such embodiments, to keep a 45 deg angle in the optical material (e.g. refractive index approximately 1.5) the spacing between the edge of the opaque metal forming a sensor electrode 260 and the subpixel 310 (i.e. viewed directly above perpendicular to the substrate) would also be at least 10 um. Such an orientation between sensor electrode 260 and the subpixel 310 minimizes the visibility of the metal mesh at large viewing angles outside the optical material.

As shown in FIG. 5C, the sensor electrodes 260 may be disposed on the encapsulation layer 530 of the display panel 220. Each of the sensor electrodes 260 may be disposed on the encapsulation layer 530. In such an embodiment, the sensor electrodes 260 may be disposed in a common layer. For example, the sensor electrodes 260 may be disposed in an array, where the sensor electrodes do not intersect with each other in the sensing area of the sensing device 240. Alternatively, one of sensor electrodes 260a and 260b may include jumpers patterned on a separate layer which interconnect sensor electrodes 260a or 260b and crossover respective ones of the other one of sensor electrodes 260a and 260b. The jumpers are insulated from the sensor electrodes that they crossover such that they don't ohmically couple to those sensor electrodes.

Further, as is illustrated in FIG. 5D, the sensor electrodes 260a may be disposed on the encapsulation layer 530, and the sensor electrodes 260b may be disposed on the substrate 520. In such an embodiment, the substrate 520 may be adhered to the encapsulation layer 530 by an optically clear adhesive (OCA). Alternatively, in one embodiment, the sensor electrodes 260a may be disposed on the substrate 520 and the sensor electrodes 260b may be disposed on the encapsulation layer 530. Further, the substrate 520 may be a circular polarizing filter of the display panel 220. Alternatively, the substrate 520 may be a non-birefringent substrate of the display panel 220. Additionally, one of the sensor electrodes 260a, 260b may be disposed on the encapsulation layer 530, and the other of the sensor electrodes 260a, 260b may be disposed on the lens 510.

The sensor electrodes 260 may span across at least a portion of the sensing region 120. In one embodiment, each sensor electrode of sensor electrodes 260 spans the entire distance across the sensing region.

The areas of localized capacitive sensing of capacitive couplings may be termed "capacitive pixels." The capacitive pixels may be formed between an individual sensor electrode and a reference voltage in embodiments employing absolute capacitive sensing methods and between groups of sensor electrodes used as transmitter and receiver electrodes in embodiments employing transcapacitive sensing methods (e.g. where fringing fields couple neighboring electrodes most strongly). For example, in an embodiment employing absolute capacitive sensing, the capacitive pixels may be formed between where parallel fields from an input object couple to system ground of the input device 100. Further, in embodiments employing transcapacitive sensing method, the capacitive pixels may be formed where fringing fields couple to neighboring sensor electrode most strongly.

A set of measurements between sensor electrodes or between sensor electrodes and an input object may be utilized by the sensor driver 250 to form the capacitive pixels of a "capacitive image" or points along one or more capacitive profiles (also "capacitive frame"). In one embodiment, the rate at which the full capacitive images are acquired is the capacitive frame rate (or sensing rate). For example, a full capacitive image (e.g. composed of multiple measurement bursts of modulation or filtered and accumulated ADC conversions) may be acquired once every 16 ms, generating a capacitive frame rate of 60 Hz. In other embodiments, the capacitive frame rate may be about 90 Hz, 120 Hz, 240 Hz, or greater. Further, in one or more embodiment, the capacitive frame rate may be less than 60 Hz (e.g. for low power sensing) and/or the number or type of bursts may be reduced or changed to lower power.

Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region, or alternately report an input object hovering (e.g., proximate to, but not in contact with an input surface of the input device 100), touching (e.g., in contact with an input surface of the input device 100), pressing on the input surface of the input device or lifting from a the input surface of the input device 100 for various GUI implementations.

In some input device embodiments, one or more of the sensor electrodes comprise one or more display electrodes used in updating the display of the display panel. The display electrodes may comprise one or more segments of a segmented Vcom electrode (common electrode(s)), a source electrode, gate electrode, an anode electrode or cathode electrode, or any other display element.

In various embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate. Further, the capacitive frame rate may be a simple rational fraction of the display rate (e.g. ½, ⅔, 1, 3/2, 2) and may be synchronized with the display refresh rate to minimize the variation in sensing report latency relative to graphical user interface update of an operating system running on the input device 100. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased. Alternately, the capacitive frame rate may be unsynchronized from the display refresh rate or the capacitive frame rate may be a non-rational fraction to minimize interference "beat frequencies" between the display updating and the input sensing.

In one or more embodiments, capacitive sensing (or input sensing) and display updating may occur during at least partially overlapping periods. For example, as the display panel 220 is driven for display updating, the sensor electrodes 260 may also be driven for capacitive sensing. In another embodiment, capacitive sensing and display updating may occur during non-overlapping periods, also referred to as non-display update periods. In one such embodiment, the non-display blanking period may be between the last line of a display frame and the first line of the following display frame (e.g. during a vertical blanking period). In various embodiments, the non-display update periods may occur between display line update periods for two consecutive display lines of a display frame and may be at least as long in time as the display line update period. In such embodiment, the non-display update period may be referred to as a long horizontal blanking period, long h-blanking period or a distributed blanking period, where the blanking period occurs between two display updating periods within a frame and is at least as long as a display line update period. In one embodiment, the non-display update period occurs between display line update periods of a frame and is long enough to allow for multiple transitions of the transmitter signal to be driven onto the sensor electrodes to be sampled and filtered. In other embodiments, the non-display update period may comprise horizontal blanking periods and vertical blanking periods. Further, the combination of horizontal blanking periods and vertical blanking periods present in the non-display update period or periods may depend on the a selected interference level and selected report rate for the measurement. Further, the types of input sensing performed may be used to determine the combination of horizontal blanking periods and vertical blanking periods present in the non-display update period or periods. For example, hover sensing may be performed between display frames and touch detection may be performed during display frames.

In one or more embodiments, the sensor driver 250 is configured to operate the sensor electrodes 260 for capacitive sensing while the display driver 230 operates the gate, source, and electrodes to update the display of the display panel.

In one or more embodiments, synchronizing to the display line update period may allow a reduction in the dynamic range of the receiver circuitry. Alternately, the coupling between the display electrodes and the sensor electrodes 260 may be compensated by analog or digital means based on the temporally coincident display update signals (e.g. subpixel data signals, gate selection signals, emission control signals and/or other sub-sampled estimate of display noise coupling).

With further reference to FIG. 2, the display driver 230 may be communicatively connected with sensor driver 250 via a communication line 270, and the display driver 230 may configured to communicate display interference data to the sensor driver 250. In one embodiment, the display interference data may correspond to gate select signals, data signals, emission control signals, and/or timing signals. The display interference data may additionally correspond to display data provided by the host device and/or processed display data.

In one or more embodiments, the display data may be sampled. For example, sampling the display data may include one or more of accumulating, decimating, and spatially filtering the display data. The change in display line output data (e.g. temporal difference) from consecutive display lines rows may be accumulated over multiple sub-pixel columns to estimate a charge coupled to each sensor electrode 260 from the display electrodes. Further low resolution color (e.g., RGB) luminosity estimates may be maintained (e.g. rolling low pass filter accumulated into an interpolated sub-sampled frame) along with PWM phase and percentage to estimate the effect of emission control coupling.

In one embodiment, the sensor driver 250 is configured to generate an interference metric based on the display interference data and reduce effects of the interference within sensor data received from the sensor electrodes 260. Such reduction is effective in minimizing false detection of input signals. For example, the reduction of the effects of the interference may increase the accuracy of differentiating between changes in capacitance caused by an input object and the interference. This improves the performance of the sensing device 240. The interference metric generated by the sensor driver 250 may be dependent upon the capacitive coupling between one or more display electrodes and the sensor electrodes 260. For example, the interference metric may correspond to the capacitive coupling between the source electrodes 330 and the sensor electrodes 260, the gate electrodes 320 and the sensor electrodes 260, the anode electrodes 370 and the sensor electrodes, the cathode electrode 390 and the sensor electrodes 260, and/or the emission control lines 335 and the sensor electrodes 260.

The capacitive coupling may be modeled as a capacitance between the display electrodes and the cathode electrode 390 and then between the cathode electrode 390 and the sensor electrodes 260. The strength of the capacitive coupling may vary depending on the distance between the sensor electrodes 260 and the display electrodes, as well as their width, thickness and overlap (e.g. in a capacitive Finite Element Model). In one or more embodiments, the strength of the capacitive coupling may depend on the thickness of lens 510. Lens 510 may have a thickness of about 5 um to 100 um. In one embodiment, as the thickness of lens 510 decreases, the sensor electrodes 260 are positioned physically closer to the display electrodes, increasing the corresponding capacitive couplings between the display electrodes and the sensor electrodes 260. Alternatively, in one or more embodiments, the strength of the capacitive coupling between the sensor electrodes 260 and the display electrodes may depend on the thickness of the encapsulation layer 530 and/or the thickness of any other layers between the encapsulation layer 530 and the sensor electrodes 260. In such embodiments, the capacitive coupling between the sensor electrodes 260 and the display electrodes may be greater than the capacitive coupling between the sensor electrodes 260 and the display electrodes in embodiments where a lens 510 is positioned between sensor electrodes 260 and the display electrodes.

Further, decreasing the capacitive coupling between the display electrodes and the sensor electrodes 260, may decrease the level (or amount) of interference caused by the driving the display electrodes for updating the display panel, allowing for the use of thinner encapsulation layers and/or display update signals having increased amplitudes.

In one or more embodiments, the capacitive coupling may be between one or more of the source electrodes 330, the gate electrodes 320, the emission control lines 335 and the cathode electrode 390 and between the cathode electrode 390 and the sensor electrodes 260. The cathode electrode 390 may be disposed such that it overlaps all of the subpixels 310, and correspondingly, the display electrodes, e.g., the source electrodes 330, the gate electrodes 320 and the emission control lines 335, and between the sensor electrodes 260 and the display electrodes, thus display electrodes are capacitively coupled with the sensor electrodes 260 via the cathode electrode.

In one or more embodiments, as the cathode electrode 390 is resistive, the cathode electrode may function as a spatial filter, spreading and/or smoothing interference caused by one or more of the subpixel data signals, the gate select signals, and the emission control signals. For example, when one or more of the display electrodes are driven with a display update signal by the display driver 230, the display update signals are capacitively coupled via the cathode electrode 390 to the sensor electrodes 260, generating interference effects that may be non-localized to the driven display electrodes. In such embodiments, the accumulated coupling between groups of subpixels 310 and the sensor electrodes 260 may be calculated to determine the interference metric, instead of calculating a per subpixel coupling with the sensor electrodes 260. This may simplify the determination of the interference metric and also simplify the interference correction steps carried out by sensor driver 250.

The values of the interference metric may be dependent upon the capacitive coupling between the display electrodes and the sensor electrodes 260. In one embodiment, the interference metric is calculated by predicting or measuring the resulting signal received on one or more of the sensor electrodes 260 in the presence of one or more of the gate select signals, the subpixel data signals (e.g. DAC codes), and/or the emission control signals being driven onto the corresponding display electrodes over the length of a capacitive measurement. In such embodiments, the predicted or the measured resulting signals may be utilized to determine the injected charge which appears as display interference (e.g. apparent capacitive coupling with an amplitude and phase dependent on the portion of the display image updated during the capacitive measurement) between the sensor electrodes 260 and the display electrodes.

In one or more embodiments, the interference (e.g. apparent capacitive coupling) between the display electrodes and the sensor electrodes 260 may be measured or estimated (e.g., predicted). For example, the apparent capacitive coupling between one or more of the source electrodes 330, the gate electrodes 320, the emission control lines 335, and the cathode electrode 390 and the sensor electrodes 260 may be measured by the sensor driver 250. The display may be driven with multiple known signals (e.g., image update signal, DBV signals, etc.) based on independent effects (e.g., orthogonal coupled signals) that cover a substantial portion of the full range of display signals, which may be used to calibrate a model of the effects of the display signals on the sensors. An initial estimate of coupling based on a design model may be pre-calculated based on electrical models and stored. In one or more embodiments, the coupling model may be updated based on measurements over time to calibrate for drift (e.g., thermal and mechanical effects, etc.). Further, coupling between the sensor electrodes 260 and the source electrodes 330 calibration may be done with emission control off (e.g., deselection of the emission control electrodes) to prevent any display image from experiencing display artifacts. In one or more embodiments, the sensor driver 250 may receive resulting signals with one or more of the sensor electrodes 260 while the source electrodes 330 are driven by the display driver 230 with subpixel data signals, the gate electrodes 320 are driven with gate select and deselect signals, the emission control lines 335 driven with emission control signals, and/or the cathode electrode 390 is driven with a common voltage. An apparent capacitive coupling between the sensor electrodes 260 and the source electrodes 330, the gate electrodes 320, the emission control lines 335 and/or the cathode electrode 390 may be determined by measuring the resulting signals.

In one or more embodiments, one or more of the sensor driver 250 and the display driver 230 may be configured to estimate the apparent capacitive coupling between the display electrodes and the sensor electrodes 260. For example, at least one of the sensor driver 250 and the display driver 230 may determine the apparent capacitive coupling based on the display update signals that are to be driven onto the display electrodes and a distance between the display electrodes and the sensor electrodes 260. In one embodiment, the apparent capacitive coupling between the sensor electrodes 260 and the source electrodes 330 may be estimated based on the subpixel data signals that are to be driven on the source electrodes 330 and/or a distance between the sensor electrodes 260 and the source electrodes 330. Further, in one or more embodiments, the apparent capacitive coupling between the sensor electrodes 260 and the gate electrodes 320 may be estimated based on the gate select and deselect signals that are to be driven on the gate electrodes 320 and/or a distance between the sensor electrodes 260 and the gate electrodes 320. In various embodiments, the apparent capacitive coupling between the sensor electrodes 260 and the emission control lines 335 may be estimated based on the emission control signals that are to be driven on the emission control lines 335 and/or a distance between the sensor electrodes 260 and the emission control lines 335.

In one or more embodiments, two or more of the subpixel data signals, the gate select and deselect signals, and the emission control signals may be combined to create an estimate of the interference metric for each sensor electrode 260. The combination may be based on the apparent capacitive coupling and OLED current flow between one or more of the display electrodes (e.g., cathode electrode, source electrodes, gate electrodes, emission control electrodes, etc.) and the sensor electrodes 260.

In one embodiment, the resulting signals may be represented as $S_j$, where j=0 ... N, where "N" is the number of sensor electrodes 260a and/or 260b. The resulting signals may correspond to a column of a capacitive image or to a profile. Further resulting signals $S_j$ may be defined as $S_j=C_j+I_j$, where C is the capacitive signal and I is the interference. Capacitance $C_j$ may correspond to the background capacitance (e.g., capacitance between the sensor electrode any other electrodes of the input device) and the change in capacitance due to an input object.

Further, the interference may be estimated by fitting resulting signals $S_j$, with an interference estimate. The interference estimate may be determined by determining which of resulting signals $S_j$ include a change in capacitance due to an input object and which signals do not include a change in capacitance due to an input object. A fitting algorithm may be applied to the resulting signals that are determined to not include a change in capacitance due to an input object to fit functions to the resulting signals. The functions may correspond to an estimate of the interference $I_j$. For example, 'basis' function may be fit to the resulting signals that are determined to not include a change in capacitance due to an input object. In one embodiment, the interference metric may be utilized by fitting algorithm. For example, the interference metric may be utilized when determining which resulting signals include a change in capacitance due to an input object and which signals do not. Further, the interference metric may be utilized in estimating the amplitude of the components used by the fitting algorithm.

In one embodiment, the interference metric may correspond to a prediction or estimation of display interference which may be calculated for one or more resulting signals received from a sensor electrode "i", at time "t", $T_i(t)$, based on a signal transmitted on a display electrode "j" at time "s", $S_j(s)$. The display electrodes may be one or more of a source electrode, gate electrode, and an emission control signal, and OLED current. The coupling between the sensor electrode and display electrode may be modelled as being linear and time invariant, and may be represented as filter response $C_{i,j}(\tau)$ representing the measured charge coupling between the sensor electrode i and the display electrode j, and the total response on the sensor electrode is:

$$T_i(t)=\Sigma_{j=0}^{N} S_j(t)*C_{i,j}(t),\qquad\text{Equation 1.}$$

By calculating $C_{i,j}(\tau)$ an estimate of potential interference (or interference metric) that will be coupled into a sensor electrode from a display electrode may be determined. In one embodiment, the coupling between sensor electrode and display electrodes may be measured.

The interference metric may include values based on the amount of display interference. In one embodiment, the interference metric includes values corresponding to each pixel of a capacitive image and/or each sensor electrode. In various embodiments, the interference metric is an array of weighted values which are used for interference reduction or mitigation. Further, the interference metric may be a common value which is used for display interference reduction or mitigation.

In one or more embodiments, the display driver 230 is configured to communicate display interference data that corresponds only to the portion of the display that will be updated while sensor data is acquired by the sensor driver 250. For example, in embodiments where the capacitive sensing frame rate is greater than that display frame rate, the entire display is not updated while sensing data corresponding to the capacitive sensing frame is acquired. In one embodiment, the capacitive sensing frame rate is 120 Hz and the display frame rate is 60 Hz. In such an embodiment, sensing data corresponding to a first capacitive sensing frame is acquired while a first half of the display is updated, and sensing data corresponding to a second capacitive frame is acquired while second half of the display is updated. In another embodiment accumulated data may be driven onto a DAC of the sensor driver 250 to compensate for the display coupled interference. Further, display interference information corresponding to updating the first half of the display may be used to determine an interference metric for the first capacitive frame, and display interference information corresponding to updating the second half of the display may be used to determine an interference metric for the second capacitive frame. Furthermore, in one or more embodiments, changes to the DBV (e.g. emission control percentage or phase, Gamma voltage driven on the source electrodes for a given image, etc.), power modes or other effects on the modeled interference may be communicated to the sensor driver 250 to allow proper compensation for the interference.

In one embodiment, display driver 230 is configured to communicate display interference information that corresponds to the gate select signals to the sensor driver 250. For example, the display driver 230 may be configured to communicate the $V_{GH}$ and $V_{GL}$ voltage levels, VSYNC signal, HSYNC signal, the order at which the gate electrodes are selected, and the emission control setting (e.g. PWM percentage, sequence, and phase) based on DBV). The sensor driver 250 may be configured to generate an interference metric that estimates the interference caused by the gate select signals. For example, the sensor driver 250 may be configured to utilize one or more of the VSYNC signal, HSYNC signal, and the order of the gate electrodes are selected to determine which gate electrodes are selected and deselected while the sensor electrodes are driven for capacitive sensing to acquire sensor data. Further, the sensor driver 250 is configured to generate an interference metric that estimates the effects of interference caused by the selection and deselection of the gate electrodes while the sensor data is acquired for the capacitive frame. The interference metric may further correspond to the voltage levels of $V_{GH}$ and $V_{GL}$.

In one embodiment, the sensor driver 250 is configured to time the acquisition of sensor data based on the timing signals. For example, the sensor driver 250 may initialize acquisition of sensor data based on one of the VSYNC signal and the HSYNC signal.

In one or more embodiments, display driver 230 is configured to communicate display interference data that corresponds to the subpixel data signals to the sensor driver 250. For example, the display interference data may correspond to an average change in value for all the subpixel data signals (e.g. accumulated and demodulated DAC outputs) for a period of time (e.g. corresponding to a sensing sample or burst). The period of time may correspond to at least a portion of a display frame update period. In one embodiment, the period of time corresponds to the portion of the display frame update period that overlaps with the capacitive sensing frame. The display interference data may additionally, or alternatively, correspond to each of the sub-sampled groups of subpixel data signals coupling to overlapping sensing electrodes. In one embodiment, the display interference data comprises information regarding which of the subpixel data signal for each of the subpixel has changed from display frame to display frame. Further, the display interference data may include sub-sampled (e.g. low pass filtered and interpolated) information related to how much the subpixel data signals have changed from display frame to display frame. In one or more embodiments, the sensor driver 250 may be configured to determine an interference metric from the display interference data, where the interference metric corresponds to the subpixel data signals for a selected display line. For example, the interference metric may correspond to an accumulated, weighted for coupling, phase delayed, demodulated, and/or filtered version of the subpixel data signals for a corresponding display line. For example, the sensor driver 250 is configured to generate a prediction of the potential interference introduced by the subpixel data signals. In one embodiment, the sensor driver 250 is configured to generate a prediction of the potential interference for different portions of the display panel. In one embodiment, the sensor driver 250 updates an interference metric based on the subpixel data signals that have changed from display frame to display frame and by how much they have changed.

In one or more embodiments, display driver 230 is configured to communicate display interference data that corresponds to the emission control signal to the sensor driver 250. For example, the display interference data may correspond to at least one of the duty cycle of the emission control signal, the size of the portion of the display panel that the emission control signal is driven onto, rate at which the emission control signal is scanned through the display lines and the order (e.g. number of lines and phase) of the emission control signal is scanned through display lines. The sensor driver 250 is configured to determine the interference metric from the display interference data, where the interference metric corresponds to the emission control signals. In one or more embodiments, the sensor driver 250 is configured to generate a prediction of the potential interference introduced by the emission control signals and/or compensation required. In one embodiment, the sensor driver 250 is configured to generate a prediction of the potential interference for different portions of the display panel introduced by the emission control signals. For example, a different interference metric may be calculated corresponding to each of the different portions of the display panel that are controlled by different emission control signal. The different portions of the display panel controlled by different emission control signals may be coupled to respective ones of the sensor electrodes 260.

In various embodiments, the sensor driver 250 may be configured to determine the interference metric from information corresponding to at least two of the gate select signals, subpixel data signals and the emission control signals. For example, the sensor driver 250 is configured to generate a prediction of interference corresponding to the gate select signals, a prediction of interference corresponding to the subpixel data signals and a prediction of interference corresponding to the emission control signals. The different interference metrics may be combined into a common interference metric or kept and utilized by sensor driver 250 separately. For example, the different interference metrics may be utilized to compensate for the display interference at the AFE or AFEs of the receiver circuitry of the sensor driver 250. In one embodiment, a DAC of the sensor driver 250 may drive predicted interference compensating signals onto the input of the AFE on a cycle by cycle basis to reduce the effect of interference and increase dynamic range. In various embodiments, the output of an ADC from the AFE may be compensated on each accumulated result based on multiple accumulated display line updates of interference. In one embodiment, a common interference metric for display compensation may be used during a first period during which one set of sensor electrodes (e.g. sensors electrodes 260a on a first axis) is operated for capacitive sensing, while multiple different metrics may be used during a second period while a second set of electrodes (e.g. sensor electrodes 260b on a second axis perpendicular to the first) is operated for capacitive sensing. In one embodiment, the sensor driver 250 is configured to generate an interference metric by generating a prediction of interference corresponding to at least two of the gate select signals, the subpixel data signals and the emission control signals.

In one or more embodiments, the display driver 230 is configured to communicate decompressed display data to the sensor driver 250, and the source driver is configured to determine the interference metric from the decompressed display data. In one embodiment, one or more of subpixel data signals, gate select signals and/or emission control signals may be determined from the decompressed display data and used to generate predictions of potential interference introduced by one or more of the signals. In one embodiment, digital signals from the source drivers 232, the gate selection circuitry, or the emission control circuitry may be digitally delayed, demodulated, temporally filtered, and spatially accumulated to provide compensation signals (e.g. digital or analog) for co-located (e.g. overlapping) sensor electrodes 260. In another embodiment, the display driver 230 is configured to communicate scaled display data to the sensor driver 250, and the sensor driver is configured to determine the interference metric from the scaled display data. In one embodiment, one or more of subpixel data signals, gate select signals and/or emission control signals may be determined from the scaled display data and used to generate predictions of potential interference introduced by one or more of the signals.

In one or more embodiments, the display driver 230 is configured to communicate processed display data to the sensor driver 250, and the source driver is configured to determine the interference metric from the processed display data. In one embodiment, one or more of subpixel data signals, gate select signals and/or emission control signals may be determined from the processed display data and used to generate predictions of potential interference introduced by one or more of the signals. In various embodiments, the display driver 230 is configured to communicate gamma corrected display data to the sensor driver 250, and the source driver is configured to determine the interference metric from the gamma corrected display data. In one embodiment, one or more of subpixel data signals, gate select signals and/or emission control signals may be determined from the gamma and/or mura corrected display data and used to generate predictions of potential interference introduced by one or more of the signals.

The sensor driver 250 may be configured to determine the interference metric synchronously or non-synchronously with when display is being updated. For example, the sensor driver 250 may be configured to determine the interference metric from the display interference data at any time during the display frame and the capacitive frame. In one embodiment, sensor driver 250 may be configured to determine the interference metric from the display interference data before a capacitive image or processed sensor data is report from the sensor driver 250 to a host device. In one embodiment, an interference metric may be generated for each sample generated when receiving the resulting signal. In various embodiments, the sensor driver 250 communicates display compensation data to minimized charge injection from the capacitive measurements on the display image line updates. For example, during display updates for a set of display lines where a particular set of sensor electrodes 260 are modulated relative to the cathode electrode 390 the gamma voltage curve (i.e. the DAC voltages applied to the subpixels 310 using source electrodes 330 affected by the cathode coupled to the particular set of sensor electrodes 260 for that set of display update lines) may be modified to minimize the interference effect from the sensor electrodes 260 affecting display update subpixel luminosity.

In one or more embodiments, a first amount of interference estimates may be utilized to compensate the sensor data corresponding to the sensor electrodes 260a and a second amount of interference estimates may be utilized to compensate the sensor data corresponding to the sensor electrodes 260b. The amount of interference estimates associated with the sensor electrodes 260a may be less than, greater than or the same as the amount of interference estimates associated with the sensor electrodes 260b. In one embodiment, the sensor electrodes 260a may be affected to a lesser extent by interference generated display update signals (e.g., one or more of gate select signals, subpixel data signals, and emission control signals) than the sensor electrodes 260b. In such an embodiment, fewer interference estimates of the display update signals may be used to compensate the sensor data received by the sensor electrodes 260a than used to compensate the sensor data received by the sensor electrodes 260b. In other embodiments, where the sensor electrodes 260a and 260b are affected substantially equally interference generated display update signals (e.g., one or more of gate select signals, subpixel data signals, and emission control signals) the same amount of interference estimates may be used to compensate the sensor data received by the sensor electrodes 260a and 260b. Further, as different display update signals may affect one of the sensor electrodes 260a and 260b more than the other, for different types of display update signals, different amounts of interference estimates may be used to compensate the sensor data received by the sensor electrodes 260a and 260b.

Figure 6:
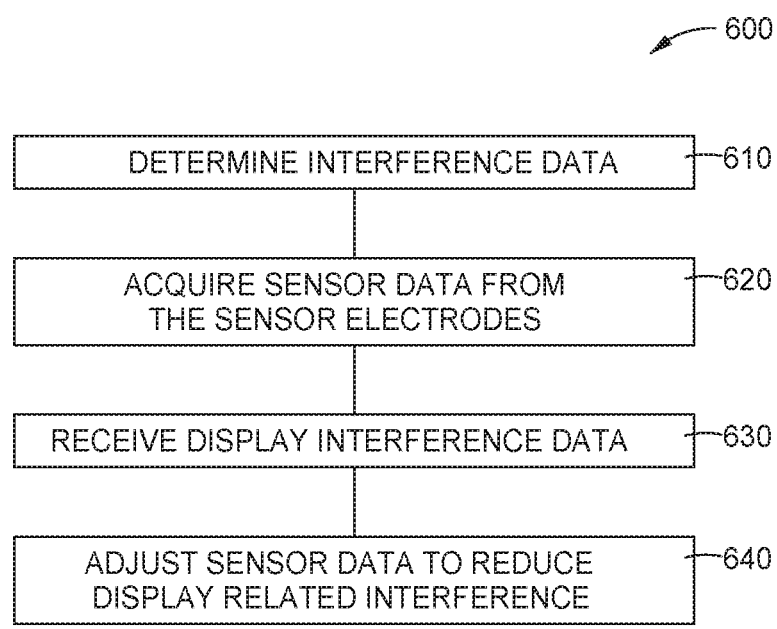
FIG. 6 illustrates a method for reducing display interference, according to one or more embodiments.

FIG. 6 illustrates method 600 for reducing display interference, in accordance with embodiments. At step 610, 610, interference data is determined. In one embodiment, the display driver 230 or the sensor driver 250 is configured to process display data received from a host device, decompressing and decoding the display data, and the display driver 230 or the sensor driver 250 may generate an interference metric based on the interference data from the processed display data. For example, the display driver 230 or the sensor driver 250 may be configured to generate an interference metric based on the interference data based on at least one of the subpixel data signal, the gate select and deselect signals and the emission control signals. In one or more embodiments, one or more of the display driver 230 and the sensor driver 250 generates the interference metric based on an apparent capacitive coupling between the sensor electrodes 260 and one or more of the gate electrodes 320, the source electrodes 330, the emission control lines 335, and the cathode electrode 390. For example, the sensor driver 250 may measure the apparent capacitive coupling between the sensor electrodes 260 and one or more of the gate electrodes 320, the source electrodes 330, the emission control lines 335, and the cathode electrode 390 The interference metric may be generated based on the apparent capacitive coupling. In other embodiments, the display driver 230 or the sensor driver 250 may calculate an estimate of the apparent capacitive coupling between the sensor electrodes 260 and one or more of the gate electrodes 320, the source electrodes 330, the emission control lines 335, and the cathode electrode 390 based on the electromagnetic and geometric analysis. In other embodiments, the display driver 230 or the sensor driver 250 may calculate an estimate of the interference metric between the sensor electrodes 260 and one or more of the gate electrodes 320, the source electrodes 330, the emission control lines 335, and the cathode electrode 390 based on the corresponding subpixel data signals, gate select and deselect signals and emission control signals.

In one or more embodiments, an estimate of the interference metric may be generated for each type of display update signal, and a single interference metric may generated from each of the estimates of the interference metrics or a respective interference metric may be determined from each of the interference estimations. In one embodiment, a first interference metric may be determined based on at least a first type of display signals and a second interference metric based on at least a second type of display signals. For example, a first interference metric may be determined based on emission control signals and a second interference metric may be determined based on subpixel data signals. Further, any compensation method may be calibrated for amplitude and phase delay by minimizing sensor measurement variation while measuring a coupling between one or more of the display electrodes and the sensor electrodes 260 for different configurations. For example, the compensation methods may be calibrated based on the image driven on the display panel 220, the DBV, the frame rate, the gate select and deselect voltages, and the like.

The interference metric may include one or more values that correspond to the amount of predicted interference that will be introduced when driving one or more of the display electrodes with corresponding display update signals. In one embodiment, the interference metric may be in the form of a two dimensional image, one or more profiles, or an array of values. In one embodiment, the interference metric may correspond to an average (e.g., mean, mode, etc.) value of the potential interference, a maximum value of the potential interference, a minimum value of the potential interference, or a median value of the potential interference.

At step 620, sensor data is acquired from the sensor electrodes 260. For example, the sensor driver 250 may be configured to operate sensor electrodes 260 for capacitive sensing and acquire sensor data from the sensor electrodes. Compensation via an analog DAC may be substantially simultaneous with the acquisition of the sensor data with the sensor electrodes. For example, compensation via an analog DAC may occur within one display line period or less of when the sensor data is acquired. In one embodiment, the sensor driver 250 is configured to operate one of sensor electrodes 260a and sensor electrodes 260b as transmitter electrodes and the one of sensor electrodes 260a and sensor electrodes 260b as receiver electrodes. For example, the sensor driver 250 is configured to operate sensor electrodes 260a as transmitter electrodes by driving sensor electrodes 260a with transmitter signals, and operate sensor electrodes 260b as receiver electrodes. The sensor driver 250 is configured to acquire sensor data by receiving resulting signals with sensor electrodes 260b. In other embodiments, the sensor driver 250 is configured to operate sensor electrodes 260 for absolute capacitive sensing. In such an embodiment, sensor data is acquired by modulating the sensor electrodes 260 and receiving resulting signals from the modulated sensor electrodes 260.

At step 630, the sensor driver 250 receives display interference data. For example, the sensor driver 250 receives the display interference data in the form of an interference metric from display driver 230 via communication line 270. Alternatively, the sensor driver 250 receives the display interference data from a host device. The display interference data corresponds to at least one of gate selection signals, subpixel data signals, and emission control signal. In other embodiments, the display interference corresponds to a timing signal, such as HSYNC signal, VSYNC signal, or any signal derived from one of the timing signals.

At step 640, the sensor driver 250 is configured to adjust sensor data to reduce display related interference. For example, the sensor driver 250 may be configured to adjust sensor data to reduce interference caused by one or more display electrodes. The sensor driver 250 may be configured to process resulting signals received from the sensor electrodes to determine changes in apparent capacitive couplings corresponding to the sensor electrodes. In one embodiment, the sensor driver 250 is configured to subtract the values of the interference metric from resulting signals received from the sensor electrodes to reduce the effects of display interference on the resulting signals. In various embodiments, the sensor driver 250 is configured to subtract the values of the interference metric from the changes in apparent capacitive couplings to determine adjusted changes in apparent capacitive couplings. Previously calculated calibration data may be communicated to a host processor of the input device 100 and stored by an Operating System running on the input device 100 to be later loaded into the sensor driver 250 to minimize calibration time.

In one or more embodiments, the sensor driver 250 may be configured to apply the interference metrics to sensor data received from different sensor electrodes. For example, a first interference metric determined based on emission control signals may be used to adjust sensor data received with the sensor electrodes 260a and a second interference metric determined based on subpixel data signals may be used to adjust sensor data received with the sensor electrodes 260b. In such an example, the emission control lines 335 are parallel with the sensor electrodes 260a, and the signals applied to the emission control lines 335 affect each of the sensor electrodes in a non-uniform manner. Further, the source electrodes are parallel with the sensor electrodes 260b, and the signals applied to the source electrodes 330 affect each of the sensor electrodes in a non-uniform manner.

In one embodiment, the sensor driver 250 is configured to determine a capacitive image and/or one or more profiles from the adjusted changes in apparent capacitive coupling. Further, the sensor driver 250 may be configured to determine positional information from at least one of the capacitive image and the profiles compensated for an interference metric.

The sensor driver 250 may be configured to determine at least one of changes in apparent capacitive coupling, a capacitive image and/or one or more profiles from the adjusted resulting signals. Further, the sensor driver 250 may be configured to determine positional information from at least one of the capacitive image and the profiles. In one or more embodiments, the resulting signals received with the sensor electrodes 260 may be combined with corresponding interference metrics to determine a scaled resulting signal. Further, when the display coupling does not significantly change from display frame to display frame (e.g. same image, DBV, and/or refresh rate) the compensation for applied during each display frame may be used without additional computation (e.g. the interference metric need not be updated).

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

What is claimed is:

1. A device, comprising:
- a display panel having a plurality of display electrodes;
- a display driver configured to drive the plurality of display electrodes;
- a plurality of sensor electrodes disposed over the display panel; and
- a sensor driver communicatively coupled to the plurality of sensor electrodes and the display driver, wherein the sensor driver is configured to:
  - acquire resulting signals via the plurality of sensor electrodes, wherein the resulting signals include effects of display-related interference;
  - receive a display signal from the display driver;
  - generate an interference metric based on the display signal, the interference metric corresponding to an amount of display interference; and
  - after acquiring, via the plurality of sensor electrodes, the resulting signals which include the effects of the display-related interference, adjust the acquired resulting signals using the interference metric to reduce the effects of the display-related interference included in the acquired resulting signals.

2. The device of claim 1, wherein generating the interference metric comprises generating an estimate of potential interference introduced by the display signal, wherein the display signal is a display update signal driven on at least one of the display electrodes.

3. The device of claim 1, wherein the display signal comprises at least one of: a subpixel data signal, an emission control signal, or a timing signal.

4. The device of claim 1, wherein the display driver is configured to update subpixels of the display panel by driving a subpixel data signal onto a corresponding source line of the display panel.

5. The device of claim 1, wherein the display panel comprises a lens and an encapsulation layer; and
- wherein at least one of the plurality of sensor electrodes is disposed between the lens and the encapsulation layer.

6. The device of claim 1, wherein the display panel is an organic light emitting diode (OLED) display panel.

7. The device of claim 1, wherein the interference metric corresponds to a capacitive coupling between source electrodes and the sensor electrodes, a capacitive coupling between gate electrodes and the sensor electrodes, a capacitive coupling between anode electrodes and the sensor electrodes, a capacitive coupling between a cathode electrode and the sensor electrodes, and/or a capacitive coupling between emission control lines and the sensor electrodes.

8. The device of claim 1, wherein generating the interference metric is based on a pre-stored model, wherein the pre-stored model models a capacitance between the display electrodes and a cathode electrode and between the cathode electrode and the sensor electrodes.

9. The device of claim 1, wherein generating the interference metric is based on a pre-stored model, wherein the pre-stored model is calibrated based on driving the display panel with multiple known signals.

10. The device of claim 1, wherein the sensor driver is further configured to generate a respective interference metric for each respective sensor electrode of the plurality of sensor electrodes.

11. The device of claim 10, wherein the respective interference metrics are based on a combination of gate select and deselect signals, emission control signals, and two or more subpixel data signals.

12. The device of claim 1, wherein the sensor driver is further configured to:
- determine which signals acquired by respective sensor electrodes include a change in capacitance due to an input object and which signals acquired by respective sensor electrodes do not include a change in capacitance due to an input object; and
- apply a fitting algorithm to the signals acquired by respective sensor electrodes which do not include a change in capacitance due to an input object.

13. The device of claim 1, wherein the sensor driver being configured to adjust the acquired resulting signals using the interference metric comprises the sensor driver being configured to subtract values of the interference metric from capacitive coupling change values corresponding to the acquired resulting signals.

14. A method for reducing effects of interference, the method comprising:
- acquiring, by a sensor driver, resulting signals via a plurality of sensor electrodes, wherein the plurality of sensor electrodes is disposed over a display panel, and wherein the resulting signals include effects of display-related interference;
- receiving, by the sensor driver, a display signal from a display driver;
- generating, by the sensor driver, an interference metric based on the display signal, the interference metric corresponding to an amount of display interference; and
- after acquiring, via the plurality of sensor electrodes, the resulting signals which include the effects of the display-related interference, adjusting, by the sensor driver, the acquired resulting signals using the interference metric to reduce the effects of the display-related interference included in the acquired resulting signals.

15. The method of claim 14, wherein generating the interference metric comprises generating an estimate of potential interference introduced by the display signal, wherein the display signal is a display update signal driven on at least one display electrode of the display panel.

16. The method of claim 14, wherein the display signal comprises at least one of the following: a subpixel data signal, an emission control signal, or a timing signal.

17. The method of claim 14, further comprising:
- updating a subpixel of the display panel by driving a subpixel data signal onto a corresponding source line of the display panel.

18. The method of claim 14, wherein the display panel comprises a lens, and wherein at least one of the plurality of sensor electrodes is disposed on the lens.

19. A processing system for an input device, comprising:
- a display driver configured to drive a plurality of display electrodes of a display panel; and
- a sensor driver communicatively coupled to a plurality of sensor electrodes and the display driver, wherein the sensor driver is configured to:
  - acquire resulting signals via the plurality of sensor electrodes, wherein the resulting signals include effects of display-related interference;
  - receive a display signal from the display driver;
  - generate an interference metric based on the display signal, the interference metric corresponding to an amount of display interference; and after acquiring, via the plurality of sensor electrodes, the resulting signals which include the effects of the display-related interference, adjust the acquired resulting signals using the interference metric to reduce the effects of the display-related interference included in the acquired resulting signals.

20. The processing system of claim 19, wherein generating the interference metric comprises generating an estimate of potential interference introduced by the display signal, wherein the display signal is a display update signal driven on at least one of the display electrodes.

21. The processing system of claim 19, wherein the display signal comprises at least one of: a subpixel data signal, an emission control signal, or a timing signal.

22. The processing system of claim 19, wherein the display driver is configured to update a subpixel of the display panel by driving a subpixel data signal onto a corresponding source line of the display panel.

23. The processing system of claim 19, wherein the display panel comprises a lens and an encapsulation layer; and
   wherein at least one of the plurality of sensor electrodes is disposed between the lens and the encapsulation layer.

24. The processing system of claim 19, wherein the display panel is an organic light emitting diode (OLED) display panel.

* * * * *